US011083338B2

(12) United States Patent
Getzinger (10) Patent No.: US 11,083,338 B2
(45) Date of Patent: Aug. 10, 2021

(54) RECTANGULAR FOOD CUTTING GUIDE FOR CUTTING CONSISTENT SIZED SLICES

(71) Applicant: Greg Getzinger, Hudson, OH (US)

(72) Inventor: Greg Getzinger, Hudson, OH (US)

(73) Assignee: Nuova Vita Corporation, Hudson, OH (US)

( * ) Notice: Subject to any disclaimer, the term of this patent is extended or adjusted under 35 U.S.C. 154(b) by 0 days.

(21) Appl. No.: 16/878,047

(22) Filed: May 19, 2020

(65) Prior Publication Data

US 2020/0298433 A1  Sep. 24, 2020

Related U.S. Application Data

(63) Continuation-in-part of application No. 16/371,763, filed on Apr. 1, 2019, now Pat. No. 10,667,652, which is a continuation-in-part of application No. 14/600,730, filed on Jan. 20, 2015, now Pat. No. 10,244,900, which is a continuation-in-part of application No. 13/555,942, filed on Jul. 23, 2012, now abandoned, said application No. 14/600,730 is a continuation-in-part of application No. 12/932,296, filed on Feb. 22, 2011, now abandoned.

(60) Provisional application No. 61/511,723, filed on Jul. 26, 2011, provisional application No. 61/339,139, filed on Feb. 22, 2010.

(51) Int. Cl.
*A47J 47/00* (2006.01)
*B26B 29/06* (2006.01)

(52) U.S. Cl.
CPC ........... *A47J 47/005* (2013.01); *B26B 29/063* (2013.01); *B26B 2029/066* (2013.01)

(58) Field of Classification Search
CPC ............... Y10T 83/04; B26B 329/063; B26B 2029/066; A47J 47/00; A47J 47/005; A47G 19/02; A47G 19/022; B26D 3/24
USPC ........ 30/299–303; 99/537; D7/698; 269/295, 269/289 R, 293
See application file for complete search history.

(56) References Cited

U.S. PATENT DOCUMENTS

| | | | |
|---|---|---|---|
| 514,096 | A | 2/1894 | Sheffield |
| 1,072,450 | A | 9/1913 | Hamblin |
| 2,906,020 | A | 9/1959 | Welsh |
| 3,060,838 | A | 10/1962 | Priore |
| 4,100,676 | A | 7/1978 | Ferguson |
| 4,189,132 | A | 2/1980 | Di Russo |
| 4,676,005 | A | 6/1987 | Seligman |
| D434,953 | S | 12/2000 | Yu |

(Continued)

*Primary Examiner* — Phong H Nguyen
(74) *Attorney, Agent, or Firm* — Brian P. Harrod; George W. Moxon, II (57) ABSTRACT

A food cutting guide comprising a base having first and second planar surfaces, a peripheral edge, at least one centering guide, and a plurality of self-centering cutting grooves formed in a planar surface that intersect to subdivide the surface into a grid of equally spaced segments to center and guide the movement of a cutting utensil in cutting the food, wherein at least one centering guide is disposed inwardly from said peripheral edge, and facilitates the placement of the food in the center; wherein the cutting grooves have terminal ends and middle portions that transition to flared openings at the terminal ends and a uniform width and depth in the middle portion between the flared openings, and has a V-shaped cross section; wherein each of said cutting grooves transition to its deepest and widest points at said peripheral edge; and maintain a consistent ratio of depth to width along the entire length of said cutting groove.

8 Claims, 4 Drawing Sheets

(56) References Cited

U.S. PATENT DOCUMENTS

| | | |
|---|---|---|
| 6,240,823 B1 | 6/2001 | Judge |
| 6,557,260 B1 | 5/2003 | Morris |
| 2005/0011074 A1 | 1/2005 | Mounce |
| 2007/0108170 A1 | 5/2007 | Costin |
| 2009/0019707 A1 | 1/2009 | Samuels |

RECTANGULAR FOOD CUTTING GUIDE FOR CUTTING CONSISTENT SIZED SLICES

CROSS REFERENCE TO RELATED APPLICATIONS

This application is a continuation-in-part of, and claims the benefit of, U.S. patent application Ser. No. 16/371,763, filed Apr. 1, 2019, which is entitled "Improved Cutting and Display Tray for Cutting Proportional Sized Pieces of Pizza," which claims the benefit of, U.S. patent application Ser. No. 14/600,730, filed Jan. 20, 2015, which is entitled "Cutting and Display Tray for Cutting Proportional Sized Pieces of Pizza," which claims the benefit of U.S. patent application Ser. No. 12/932,296, filed Feb. 22, 2011, which is entitled "Method and System For More Accurately Determining Nutritional Values and Reducing Waste of Food Items," which claims the benefit of provisional application Ser. No. 61/339,139 filed Feb. 22, 2010, which is entitled "Method and System For More Accurately Determining Nutritional Values and Reducing Waste of Food Items" and are incorporated herein by reference; and is a continuation-in-part of, and claims the benefit of, U.S. patent application Ser. No. 13/555,942, filed Jul. 23, 2012, which is entitled "System Device And Method Of Using A Proportional Cutting Device To Cut Equal Size Slices Of Pizza," which claims the benefit of provisional application Ser. No. 61/511,723 filed Jul. 26, 2011, which is entitled "System Device And Method Of Using A Proportional Cutting Device To Cut Equal Size Slices Of Pizza" and are incorporated herein by reference."

BACKGROUND OF THE INVENTION

The invention is directed to a food cutting guide and more particularly to a pizza cutting guide to facilitate cutting equal size slices that ensure the nutritional values of the slices are equal, reducing waste of food and thereby increasing food section sales and sales profits.

Pizza shops or restaurants, especially "New York style" pizza shops, often sell pizza by the slice. These pizzas are sliced into large slices, for example, six large 60° angle slices. Customers select which piece to purchase, and, due to human nature, they will typically choose the largest slice to get the most for their money. This practice leads to the smallest pieces going unsold, being sold for a lesser price, or possibly being discarded, resulting in much waste and loss of revenue. On average, the 2 smallest slices out of every 6 slices, or ⅓ of pizzas by the slice, are thrown out. Ensuring that all 6 slices are the exact same size will reduce or eliminate the discarding of the smallest, unsold slices, and thus result in increased revenue and profits.

Often times, pizza is cut by hand and usually under the stress of time because the pizzas are hot and need to remain hot so that they can be delivered hot, as well as the usual stress of a business where time is money and tasks need to be done as quickly and efficiently as possible. In cutting pizzas by hand, there is a desire to produce equal slices, but the lack of human skill and effort and the haste to get the job done lead to the achievement of less than equal slices.

Further, public and private schools, sports teams, booster clubs, children party centers, hospitals, nursing homes and institutions all have a need for pizzas and/or food items which are cut into equal slices for lunch programs, meals, fund raisers, pizza by the slice sales, and the like. When there are equal slices, there are fewer leftovers due to odd shapes or undersized or oversized slices. Thus, there is a need for a cutting guide to ensure that different size diameter pizzas (e.g., an 8 or 14 inch diameter pizza) can be cut into equal size slices.

There is also a need for determining the nutritional values of the food items, reducing waste of the food items and increasing profits of food item sales. Various prior art attempts have been made to develop products for cutting food items/segments/portions into equal slices and/or shapes. Some of those prior art devices have focused on a guide that holds the pizza, while others have focused on prior art devices for cutting the pizzas. However, all of those prior art attempts have various limitations and disadvantages, and the present invention provides an improvement over these prior art devices.

Some prior art devices have pointed protrusions, for example molded into the guide so that the pizza is held by the protrusions during the cutting process. However, these protrusions would hamper sliding the pizza off of the guide into a delivery box as often is required.

Further, nutritional studies indicate that many popular foods eaten in the US are wedge-shaped (e.g., pizza, cakes, and pies), and these foods affect the amount of saturated fat and sugar that are consumed by individuals and that they are associated with degenerative health conditions. Thus, it is important that amounts of wedge-shaped and other food sizes reported in food consumption surveys be as accurate as possible (See e.g., Journal of the American Dietetic Association, Mar. 14, 2006). However, the according to many scientific articles, standard techniques for measuring portion sizes of wedge shaped foods are often inaccurate and therefore the invention discussed herein can be used to eliminate many of those inaccuracies.

Notwithstanding these prior art devices for cutting equal pizza slices and related applications, there remains a need for method and system for determining nutritional values, reducing the waste of food items and increasing profits in the sale of food items utilizing an equal slice cutting device, and the like.

SUMMARY OF THE INVENTION

The present invention relates to A food cutting guide comprising a base for supporting and cutting food items, said base having first and second planar surfaces, a peripheral edge, at least one centering guide, and a plurality of self-centering cutting grooves formed in at least one of the planar surfaces that intersect to subdivide the surface into a plurality of equal sized, equally spaced segments to facilitate, center, and guide the movement of a cutting utensil in cutting the food item, and wherein said base defines a peripheral edge, wherein said at least one centering guide is disposed inwardly from said peripheral edge on a planar surface having said cutting grooves, and facilitates the placement of the food item in the center of the cutting surface; wherein said plurality of cutting grooves form a grid and are equally spaced to facilitate cutting equal size slices of food using a food-cutting utensil; wherein each of said cutting grooves has a terminal end and a middle portion, wherein the middle portion transitions to a flared opening at the terminal end of each of the plurality of cutting grooves and a uniform width and depth in the middle portion between said flared opening and said center point, and has a V-shaped cross section that has its widest opening at the planar surface having said cutting grooves and transitions to a trough that is its narrowest point; wherein said flared openings extend beyond said centering guide, end on said peripheral edge, and are widest at the peripheral edge and taper to the width of the middle portions; wherein each of said cutting grooves transition to its deepest and widest points at said peripheral edge; wherein said cutting grooves are deeper and wider at said terminal ends and maintain the same proportions along the entirely of the length of the cutting groove; and wherein each of said cutting grooves maintain a consistent ratio of depth to width along the entire length of said cutting groove.

BRIEF DESCRIPTION OF THE DRAWINGS

One or more implementations of the present invention will now be described with reference to the attached drawings, wherein like reference numerals are used to refer to like elements throughout the drawings.

DETAILED DESCRIPTION OF THE INVENTION

The invention is directed to a food-cutting device which facilitates the cutting of food items such as pizza and thus reducing waste of food items, which results in larger profits. The device is a means for supporting the food item and guiding and facilitating the proportional cutting of the food, such as pizzas, pies, cakes, sandwiches (subs/submarine sandwiches/hoagies/etc.), garlic bread, yeast blocks, and other suitable foods, into equal proportions.

As used herein, the terms "slice," "portion," "segment," and "piece," as well as their plural forms, are used interchangeably. As used herein, "equal" slices does not mean 100% identical slices, since that is essentially impossible with unequal distribution of toppings, sauce, and cheese that comes with making food, especially pizzas. Rather, equal means the guide facilitates cutting consistent slices that visually appear to be of the same shape and size, with no slices being significantly or obviously the largest or smallest slice (as in "equal from pizza to pizza", not necessarily "equal from slice to slice"). It produces slices that are closer to identical and perfectly equal than can be achieved by cutting a pizza by hand using only one's eyes to approximate equal slices. It is the difference between drawing a circle freehand and drawing a circle using a compass; operator error with the compass can still produce a less than perfect circle, and a prodigy artist might produce a perfect freehand circle, but for the majority of people, using a compass will likely result in closer to a mathematically perfect circle than the person drawing one freehand. Likewise, the user of the present guide will produce more consistent and similar sized slices than a person using a knife freehand.

The cutting guide of the present invention can be used with a variety of cutting means or utensils, and so is not limited to any particular cutting utensil, for example, a roller blade, a knife, a rocker knife, and the like. The guide also can be used as a two sided pizza guide, for example, with various number of grooves on each one or both side, of the guide, and so does not require a user to have separate pizza guides (for example, comprising a six slice side, a ten slice side, a sixteen slice side).

In addition, the present invention provides a method or process for facilitating concession sales and institutional sales, but it also facilitates events and/or groups comprising fund raisers, pizza shops, pizza franchises, wedding planners, restaurants, hospitals, channels of dealers/distributors, schools, universities, nursing homes, caterers, and other groups that sell food items, known by those of skill in the art.

Figure 1:
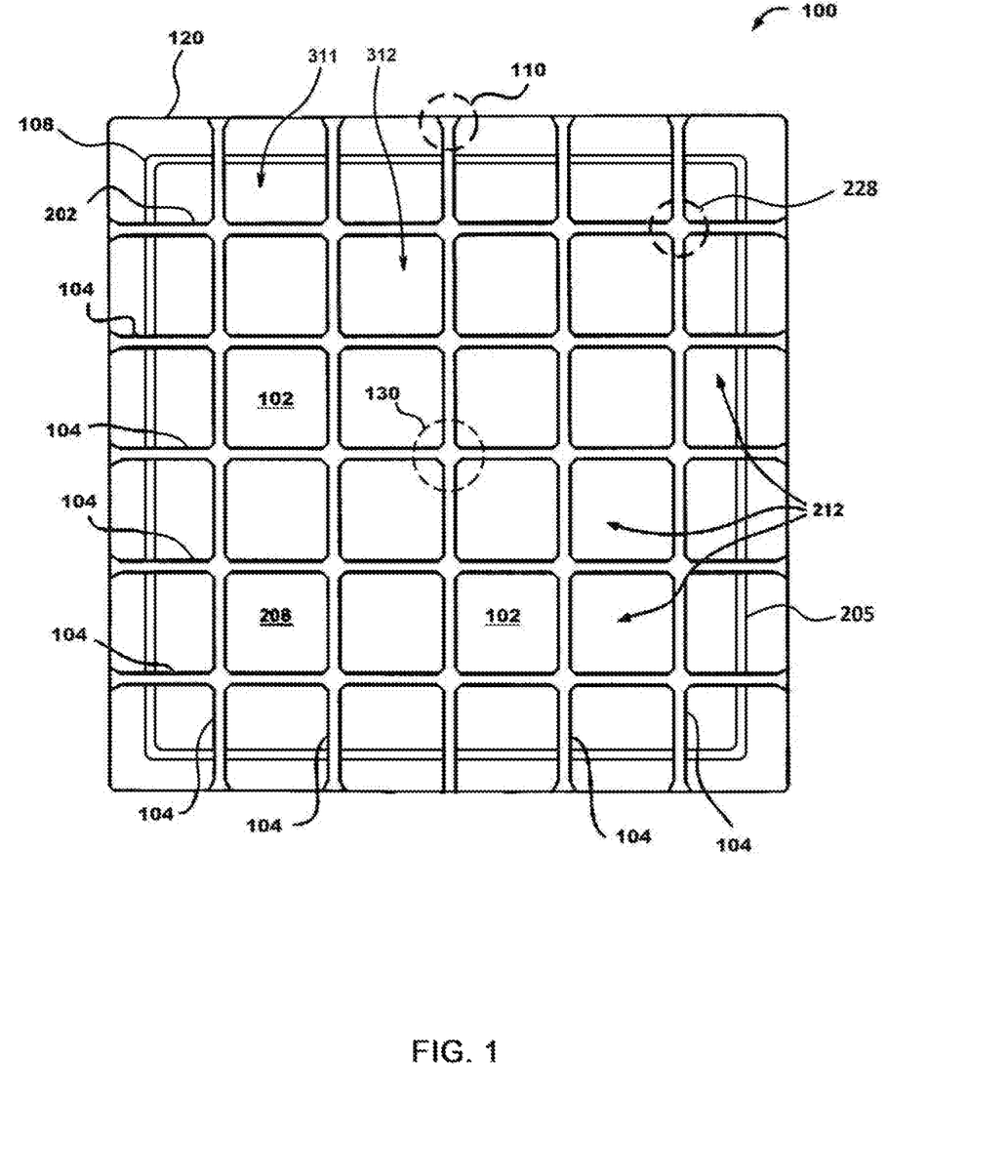
FIG. 1 is a top view of an embodiment of the invention.

The device comprises a base, which provides means for supporting and cutting food. As seen in FIG. 1, the present invention consists of a flat, guide body 120; however, the guide body 120 can include other shaped groves comprising triangles, diamonds, rectangles, and the like. The body 120 has a plurality of grooves 104 to facilitate cutting of the pizza (for example). Although the body 120 is illustrated as a rectangular shape (FIG. 1) it can have any shape known by one of those of skill in the art, comprising an oval shape, a circular shape, and the like. In addition, although the grooves are shown ending at the outer edge of the board the groove could be formed within the confines of the body 120, away from the outer edge of the body 120.

In one embodiment illustrated in FIG. 1, a pizza (not shown) can be placed on a first planar surface 102 of a proportional cutting guide 100 and a cutting tool can be used to slice and/or cut the pizza into consistent rectangular segments as desired. The cutting tool can be, for example, a handle held pizza cutting wheel, a knife, a multiple handle rocker pizza blade, and the like. Beveled slots and/or cutting grooves 104 are formed, cut, routed, marked, or a combination thereof, and the like, into the first planar surface 102 of the guide 100 allowing the cutting tool to cut through the pizza. The cutting grooves 104 are self-centering, using a V-shape cross-section to insure the cutting device always lands in the valley of the V (See FIG. 2). This assures a consistent cut between pizzas, and provides equal sized slices. In the case of thick, or tall food items, such as garlic bread or cakes, the cutting grooves 104 are visual guide for aligning a knife, which will facilitate cutting equal sized portions.

The exact depth of the cutting grooves 104 is not critical, but it does require balancing the depth of the cuts with the thickness of the guide. If the guide is too thin, the grooves 104 will constitute a significant loss of material, thus leading to a fragile cutting guide. If the guide is quite thick, it will be able to support multiple, deep groves, but the guide itself will become heavy and unwieldy. Preferred groove cut depths are 0.09±0.025 inches and widths of 0.18±0.0625 inches, and guide or tray thickness of ⅜" to 5/16".

Because the grooves 104 are set into the surface of the base 102, the blade passes fully through the pizza, completely cutting separated slices, including the crust. This removes the hassle of having to hand-separate slices, usually by tearing apart a small bit of crust that holds two slices together. The guide herein facilitates cut-through.

The V-shaped grooves, or "V-grooves" 104 in the present invention are preferred over square grooved cutting boards. In the case of a square grooved board, when cutting pizzas with a roller knife (a common tool in pizza parlors), the user must stand nearly directly over the pizza when using the knife to insure that the knife stays centered in the grooves, and that they cut the pizza as evenly as possible. However, the V-grooves 104, because they are self-centering, provides flexibility since it does not require the user to stand in an exact position to cut pizzas, which is believed to allow the user to stand back when using a cutting tool, in a more comfortable position. This reduces fatigue and discomfort for employees.

The centering slots or guides 108 allow a user to center the pizza on the first planar surface 102 so that a pizza center and a device center 130 are properly aligned. The centering slots 108 are slightly larger in perimeter than the perimeter of the pizza to be cut. The centering guide 108 can be rectangular or square to accommodate rectangular or square pizzas, or it can be circular (See FIG. 4) to accommodate traditional circular pizzas. For example, if the pizza shop sells pizzas that are 8 inches in diameter the circular centering slot may be approximately 8.25 inches in diameter. For example, the centering guides 108 can be positioned inwardly 0.5 to 4 inches in from the outer edge; that is, the perimeter(s) of the centering guide(s) 108 are set back, or are less than the perimeter of the tray or guide 100 itself. The exact dimensions are not critical. A centering guide set in 3 inches from the edge is preferred, especially for smaller sized pizza oven paddles that are used with a rocker knife. The 3 inches allows room for the rocker knife to begin and end on the guide, whereas a smaller set-back centering guide 112 could lead to the rocker knife, in beginning or ending its cuts, to land on the table, which could dull the blade and damage the table surface. In addition, the setback space between the edge of the tray and the centering guides leaves room to touch/hold/carry the tray without the user touching the food. This is especially important in restaurant settings where patrons would not want their food touched by the server. This setback space prevents or minimizes the transmission of germs to the food, and also provides more options for touching the tray so that subsequent users or customers can contact the tray without touching the same spot as the prior users, which minimizes or eliminates transmission of surface-to-surface contamination or illnesses. Larger cutting guides or paddles, which tend to be heavier and wider (an important dimension since it could become wider than the door to the pizza oven), might use smaller set-backs for sake of convenience and weight. For example, an extra-large 16 inch pizza might only use a 1.5 inch set back centering guide. This leaves sufficient room for aligning the cutting device in the cutting groove prior to making contact with and cutting the pizza.

If the cutting guides 108 were not set back from the edge, and the cutting guides were reduced to only the outermost edge of the tray, the device would have little to no usefulness, and would be essentially a plate. For instance, if the tray were large enough to hold the pizza, and feature the cutting grooves 104, the cutting guide 112 would be so far away from the pizza's edge that the user would have to eye-ball the cut—to guesstimate—and the guide would be useless; no different than if there were no cutting guide in the first place. If the tray were smaller, such that the outer edge/cutting guide were close to the pizza's edge, the pizza could completely cover and obscure the cutting guide and cutting groove inlets or cutting groove entry guides 110, leaving the cutter to guess as to where to make the first cut, or leave little to no room for aligning the cutting knife. The entry guides 110 are flared openings at the terminal ends of the cutting grooves, designed to guide or funnel the cutting device into the cutting groove 104 to make beginning a cut easier. The entry guides 110 are located outside the largest of the centering guides 108. The exact dimensions of the entry guides are not critical, but have a larger opening that the cutting groove 104 and taper to the uniform thickness of the middle portion of the cutting grooves 104. A preferred width of the flared entry guides 110 is 0.323±0.02 inches and maintains the angle θ (FIG. 2) of the grooves 104.

Figure 4:
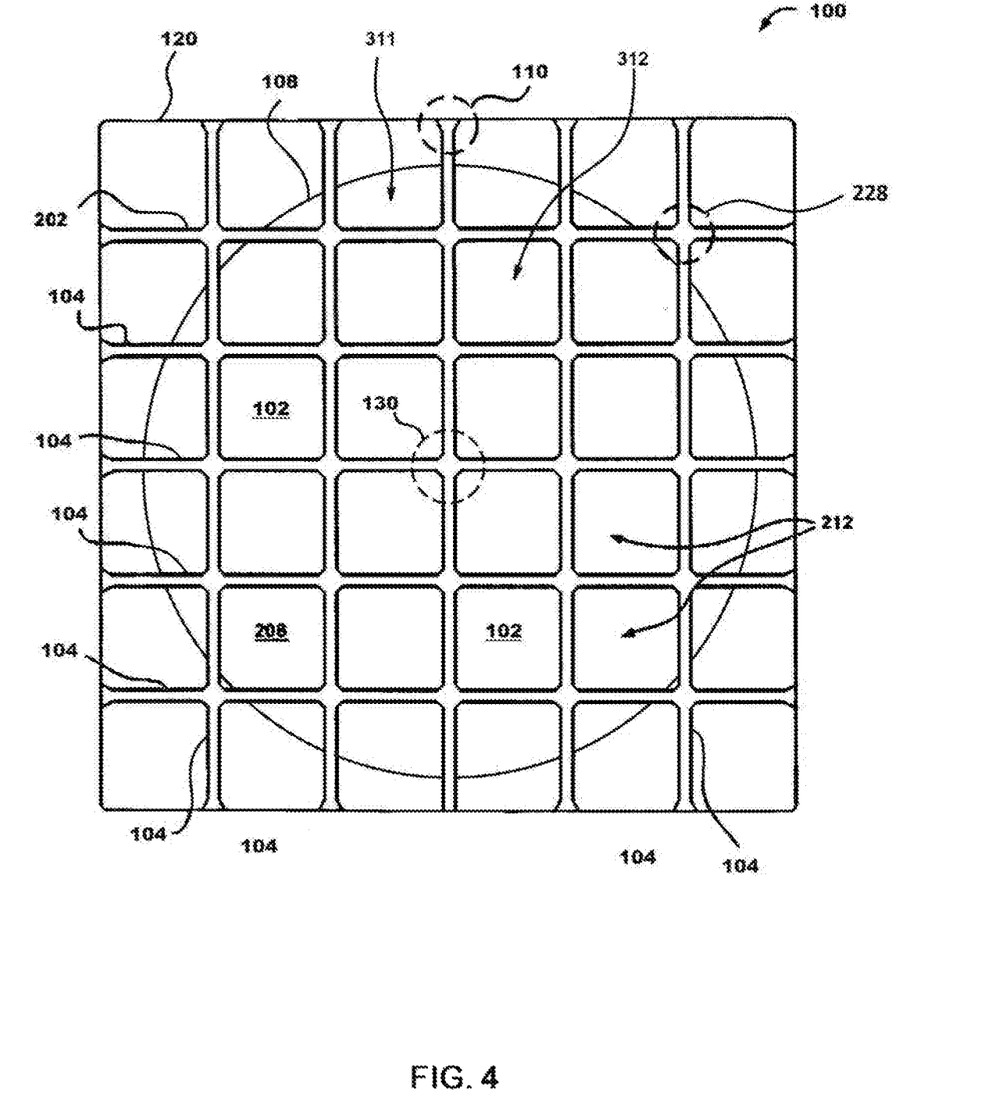
FIG. 4 is a top view of an alternate embodiment of the present invention.
Figure 5:
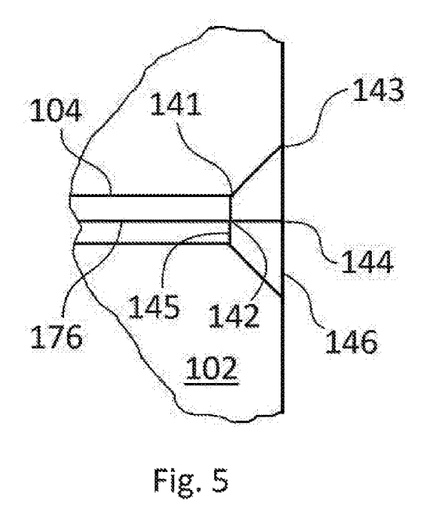
FIG. 5 is a partial enlarged top view of the flared ends of a cutting grove.
Figure 6:
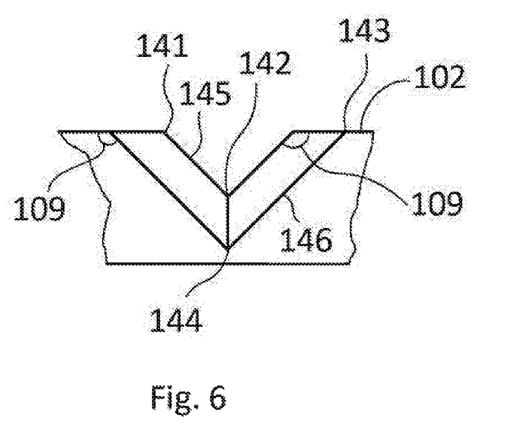
FIG. 6 is a partial enlarged front view the embodiment shown in FIG. 5.
Figure 7:
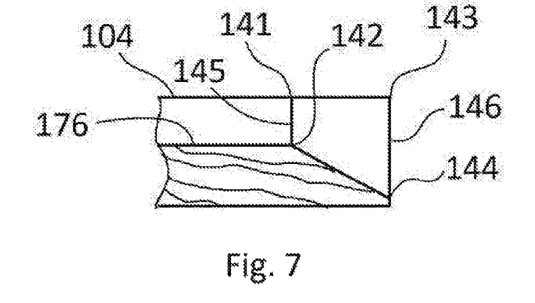
FIG. 7 is a partial cross-sectional side view of the embodiment shown in FIGS. 5 and 6.

The flared openings 110 shown in FIGS. 1 and 4 are shown in more detail in FIGS. 5-7. As shown in FIGS. 5-7, the flared openings of the cutting grooves are deeper, wider versions of the cutting grooves 104. The cutting groove 104 maintains its constant width until the transition point 141 to a wider opening that flares outward until it intersects the edge of the tray 143. Likewise, the valley 176 of the cutting groove maintains its constant, uniform depth until it reaches the transition point 142 to a deeper opening the slopes or flares downward until it reaches the edge of the tray 144. The interior geometry of the cutting groove 104 is maintained until the transition section, where the grooves flare from their narrowest point 145 to deeper, wider grooves that end on the edge of the tray at their widest point 146. The proportions are maintained as the grooves become deeper and wider. i.e. the ratio of the depth to the width of the cutting groove is the same at the narrow interior portion 104, as it is at the edge 143, and all points in between. Furthermore, the angle of the trough of the cutting groove is maintained along its entire length, including the flared openings at the terminal ends; likewise the cross-sectional angle 109 of the cutting groove to the flat upper surface is constant along the length of the cutting groove, including the flared openings at the terminal ends, and all points in between.

Once sliced, the pizza may be served on the guide 100 or slid off onto a serving plate, platter, tray, cardboard delivery box, and the like. Although the guide slots 108 are illustrated as being continuous, dashed or interrupted guide slots can be formed in the board to properly center the pizza. These slots are the centering guides 108 and are centered on a center of the intersection 130 of the cutting grooves 104. The center of the board is apparent since it is the intersection 130, but once a pizza is placed on the cutting guide, the focus is obscured and the pizza becomes hard to center absent any centering guide(s). Therefore, by adding the centering guides 108 mentioned supra, the inventor ensured that the pizza is properly centered in order to cut equal sections of pizza and provide the proportioning suggested for dietary control. This same idea applies for a circular cutting guide (FIG. 4). In addition, although the segments 212 are show as equal they can be two or more different sizes, for example, one slice large for adults and one slice smaller for kids, or edge pieces with crust 311 and center pieces with no crust 312.

In addition, though not shown letters or numbers can be cut, laser etched, and the like to indicate the diameter size in inches, millimeters, etc., at that location, for example. In addition, directions, recipes, artwork, cooking instructions, quotes, messages, individual names, company logos, and the like, can be cut, laser etched, burned, etc. into the first planar surface 102, or a second planar surface (not shown) of the proportional cutting guide 100. Also, the slots and/or grooves can be replaced by parallel ridges, elevated guides, and the like, and fall within the scope of this invention.

In this embodiment, the guide 100 is approximately rectangular in shape and may be constructed from a variety of materials comprising wood, such as ash, hickory, oak, walnut, maple and purple heartwood, chestnut, cheery; plastic, porcelain, metal, stone, wood composite materials, bamboo, recycled paper composite, Corian®, plastic composite materials, food safe materials and the like.

The food cutting guide of the present invention includes a base means for supporting and cutting food, the base having first and second planar surfaces, a peripheral edge, and a plurality of cutting grooves formed in at least one of the planar surfaces, and at least one centering guide disposed inwardly from said peripheral edge on at least the planar surfaces having said cutting grooves. The cutting grooves have a uniform width and a flared, opening at the terminal end of each of the plurality of cutting grooves to facilitate and guide the movement of a food cutting utensil in cutting the food, where the at least one centering guide facilitates the placement of the food in the center of the cutting surface. The plurality of grooves intersect and are equally spaced to facilitate cutting consistent size slices of food, where the first and second planar surfaces have sufficient friction such that protrusions (for example spikes or a rim) are not necessary to stabilize the equal size slices and/or sections of food during cutting. The first and second planar surfaces have a friction means of sufficient friction to hold the food item and slices stationary during cutting, yet low enough friction to still allow the food to slide off for removal of the sliced food by sliding it off of the guide, for example when sliding a sliced pizza into a pizza box.

Figure 3:
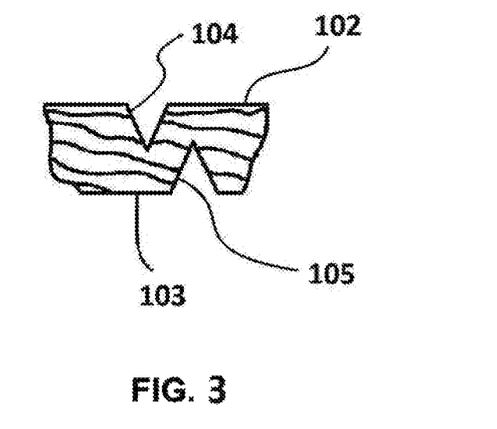
FIG. 3 is a partial cross sectional view of an alternate embodiment of the present invention.

The guide 100 can be manufactured utilizing a variety of techniques comprising CNC machining, routing, injection molding, rotational molding, blow molding, and the like. The guide 100 has a pair of substantially flat planar surfaces with the first planar face 102 and a second planar face 103 (FIG. 3) parallel to the first planar face 102. The second planar face 103 can have a separate, second set of cutting grooves 105. Although the device is described with parallel faces the inventor(s) contemplated non-parallel planar surfaces and such embodiments are considered part of this invention so that the upper facing surface is at an angle when the device is sitting flat on a table.

The dimensions of the guide 100 are sufficiently large to accommodate the pizza to be cut or proportioned. For example, the guide 100 may be large enough to accommodate pizzas ranging from four to sixteen inches in diameter/width. In addition, slots, marking and the like can be made on one or both planar surfaces, and the markings, slots and the like can be the same or different on either planar surface. In other words, the first planar surface can be used to cut eight equal slices whereas the second planar surface can be used to cut ten equal slices.

The guide 100 is sufficiently thick (e.g., ¼, ⅜ and ½ inches thick) so that the guide 100 remains substantially rigid after slots or cutting grooves 104 are created in the first planar surface 102 and/or the second planar surface of the guide 100. The guide 100 shown in FIG. 1 (and FIG. 4) is substantially uniform, however, the guide 100 of varying thickness designed to reduce weight, material costs, and the like would still be within the scope of the invention. In other words, the portion of the guide 100 where the cutting grooves are located could be the thickest portion of the guide 100 wherein the flanged portion between the cutting grove portions can have material removed so that the pizza remains relatively flat, such as honeycombed, grooves and the like and can be easily slid off the guide 100. In addition, through holes (i.e., lightening/weight reduction holes), and the like can be formed by removing material or molding the device to lighten the board for the end user. In addition, a very lightweight composite, such as an aluminum honeycomb sandwiched between two layers of material (e.g., plastic, composite, bamboo, etc.) could be utilized and all such devices are encompassed in the scope of this invention.

The slots 104 extend into the guide 100 a sufficient depth, for example one eighth of an inch, to allow the cutting tool to completely cut through the pizza placed on the first planar surface 102. FIG. 1 shows slots 104 to cut consistent pieces of pizza but is not intended to be a limit on a number of the slots formed in the guide 100. The number of cutting guides 104 can be increased or decreased as desired; the number shown in the drawings is for purposes of illustration and is not a limitation.

Figure 2:
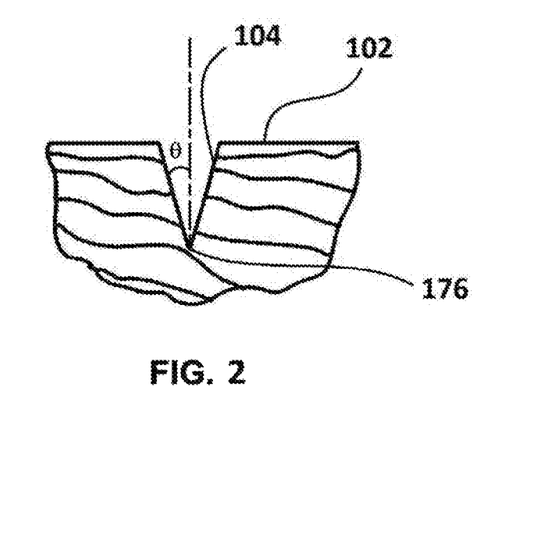
FIG. 2 is a partial cross sectional view of the present invention.

FIG. 2 illustrates the slots/grooves 104 shown in FIGS. 1 and 4. The slot has symmetrical angled sides, which meet at a valley 176, forming a V-shape. These V-shaped cutting grooves force the cutting blade to fall to the valley at the groove's center. Thus, the grooves are self-centering, which results in consistent, precise cuts. The sides of the V-grooves have an angle θ (theta) in a range of 30° to 60° measured from the vertical, or 60° to 120° measured between the angled sides of the V-groove. The preferred angle θ is 45° (or 90° when measured from side-to-side). As used herein, "V-groove" or "V-shaped groove" includes grooves with angled sides meeting at a point/valley 176, as shown in FIG. 2.

While this embodiment teaches this design, the scope of the invention is not limited to parallel and perpendicular slots of equal spacing. Any desirable slot design may be created in a planar surface of any shaped device such as other geometric or decorative shapes including diamonds, triangles, rectangles, and the like. Additionally, the shape of the proportional cutting device may be circular, square, rectangular, or any other shape desirable to a user.

Although the invention has been illustrated and described with respect to one or more embodiments, implementations, alterations, and/or modifications may be made to the illustrated examples without departing from the spirit and scope of the appended claims. In particular regard to the various functions performed by the above described components or structures (assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including". "includes", "having", "has", "with", or variants thereof are used in either the detailed description and the claims, such terms are intended to be inclusive in a manner similar to the term "comprising".

What is claimed is:

1. A food cutting guide comprising:
   a base for supporting and cutting food items,
   said base having first and second planar surfaces, a peripheral edge, at least one centering guide, and a plurality of self-centering cutting grooves formed in at least one of the planar surfaces that intersect to subdivide the surface into a plurality of equal sized, equally spaced segments to facilitate, center, and guide the movement of a cutting utensil in cutting the food item, and
   wherein said base defines a peripheral edge,
   wherein said at least one centering guide is disposed inwardly from said peripheral edge on a planar surface having said cutting grooves, and facilitates the placement of the food item in the center of the cutting surface;

wherein said plurality of cutting grooves form a grid and are equally spaced to facilitate cutting equal size slices of food using a food-cutting utensil;

wherein each of said cutting grooves has a terminal end and a middle portion, wherein the middle portion transitions to a flared opening at the terminal end of each of the plurality of cutting grooves and a uniform width and depth in the middle portion between said flared opening and said center point, and has a V-shaped cross section that has its widest opening at the planar surface having said cutting grooves and transitions to a trough that is its narrowest point;

wherein said flared openings extend beyond said centering guide, end on said peripheral edge, and are widest at the peripheral edge and taper to the width of the middle portions;

wherein each of said cutting grooves transition to its deepest and widest points at said peripheral edge;

wherein said cutting grooves are deeper and wider at said terminal ends and maintain the same proportions along the entirely of the length of the cutting groove; and wherein each of said cutting grooves maintain a consistent ratio of depth to width along the entire length of said cutting groove.

2. The cutting guide of claim 1, wherein said at least one centering guide comprises a rectangle and is disposed inwardly from the peripheral edge.

3. The cutting guide of claim 1, wherein said at least one centering guide comprises a circle and is disposed inwardly from the peripheral edge.

4. The cutting guide of claim 1, wherein said plurality of cutting grooves comprise a first set and a second set of parallel cutting grooves, wherein said first set of cutting grooves is perpendicular to said second set of cutting grooves, and wherein said plurality of cutting grooves extend to the peripheral edge.

5. The cutting guide of claim 1, wherein said at least one centering guide comprises two centering guides, wherein both centering guides share a common center point and are disposed inwardly from the peripheral edge.

6. The cutting guide of claim 1, wherein said at least one centering guide comprises more than two centering guides, wherein all of the centering guides share a common center point and are disposed inwardly from the peripheral edge.

7. The cutting guide of claim 1, wherein the base is rectangular.

8. A method of cutting equal sized food portions comprising:
placing a food item on the cutting guide of claim 1,
aligning a cutting device in a cutting groove of the cutting guide of claim 1;
cutting the food item by running said cutting device in said cutting grooves of the cutting guide of claim 1.

* * * * *